July 12, 1966 G. COLMAN 3,260,150
SELF-TAPPING INSERT WITH CHIP BREAKER
Filed Jan. 7, 1964 2 Sheets-Sheet 1

INVENTOR.
GEORGE COLMAN
BY
Dean, Fairbank and Hirsch
ATTORNEYS

July 12, 1966 G. COLMAN 3,260,150
SELF-TAPPING INSERT WITH CHIP BREAKER
Filed Jan. 7, 1964 2 Sheets-Sheet 2

INVENTOR.
GEORGE COLMAN
BY
Dean, Fairbank and Hirsch
ATTORNEYS

United States Patent Office 3,260,150
Patented July 12, 1966

3,260,150
SELF-TAPPING INSERT WITH CHIP BREAKER
George Colman, Waltham, Mass., assignor to Groov-Pin Corporation, Ridgefield, N.J., a corporation of New York
Filed Jan. 7, 1964, Ser. No. 336,217
4 Claims. (Cl. 85—47)

This invention relates to the art of self tapping fasteners and more particularly to a self tapping insert adapted to self tap screw threads into the material into which it is to be anchored.

As conducive to an understanding of the invention it is to be noted that self tapping inserts have been provided which tap a threaded seat in an opening in which the insert is driven in order to retain the insert in such opening. Such insert is generally used where it is desired to removably attach one member to a second member of relatively soft material such as aluminum, plastic or wood since the threads made directly in such material would be likely to strip if tension was applied against a screw for example, directly coating with threads in the soft material.

Where, as the insert is driven into the opening in such soft material, the self-tapping action causes the tap chip to be cut away in a continuous strip which enters the threaded bore of the insert, for example, or which interferes with the external threads of the insert, such continuous strip is relatively difficult to remove since it tends to be compressed and subsequent insertion of a screw member or the like into the insert is interfered with by the presence of the chip.

It is accordingly among the objects of the invention to provide a self-tapping insert which may readily be fabricated with substantially no increase from the cost of making a conventional self-tapping insert and in which the presence of continuous strips of tap chips are substantially eliminated thereby implementing tap chip removal by the application of an air gun, for example, to blow out the broken chips, or by shaking out the chips when the components are turned upside down.

According to the invention, a self-tapping insert is provided having a chip relief aperture or passageway between the threaded exterior surface of the insert body and the bore of the insert body and an abutment is formed in the path of movement of the tap chip removed by the tapping action of the insert as it is being positioned, which causes breakage of the chip into relatively small pieces which may readily be blown out or otherwise removed.

Figure 1:
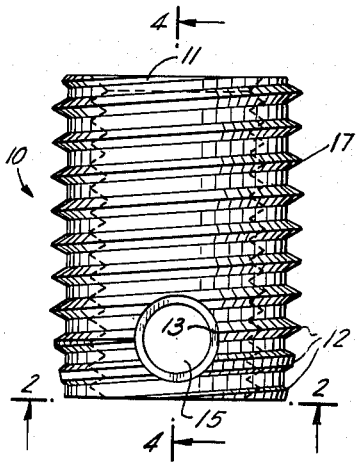
Figure 3:
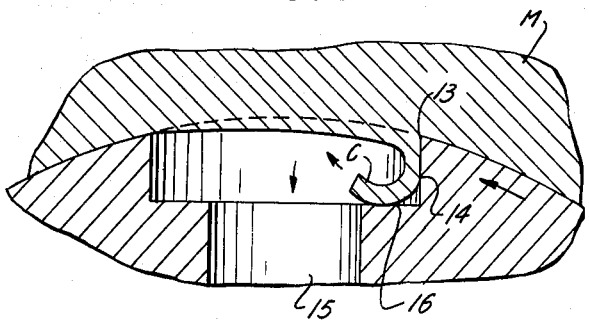
Figure 2:
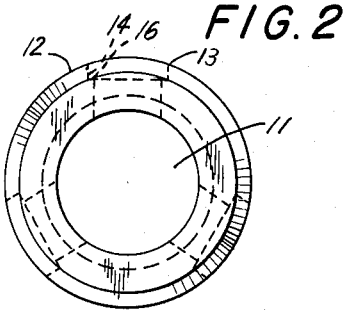
Figure 4:
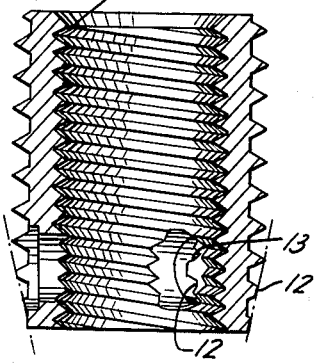
Figure 5:
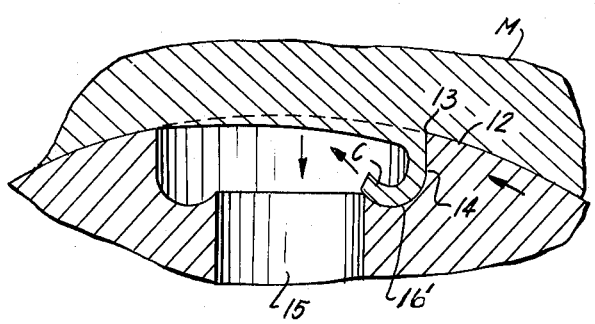
Figure 6:
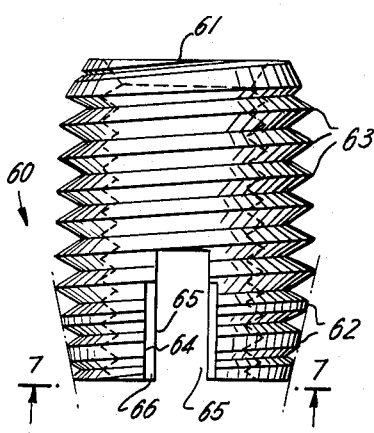
Figure 7:
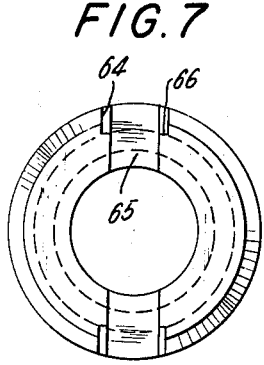
Figure 8:
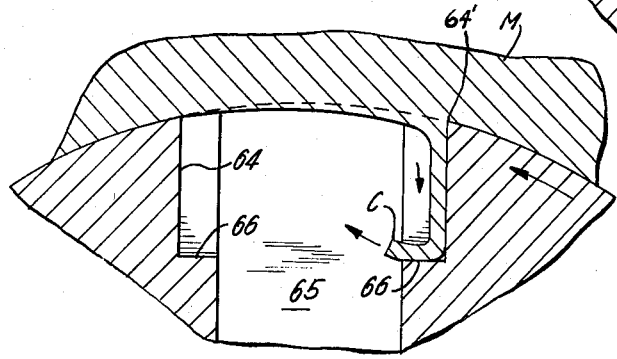

In the accompanying drawings in which are shown one or more of the various possible embodiments of the several features of the invention, FIG. 1 is a side elevational view of one embodiment of a self-tapping threaded insert made in accordance with the teachings of this invention, FIG. 2 is an end view taken on line 2—2 of FIG. 1 of the self-tapping threaded insert showing the chip breaking obstruction formed by a planar surface extending perpendicular to the cutting shoulder, FIG. 3 is an enlarged detail view adjacent the chip relief aperture of the insert of FIG. 1 showing the tap chip breaking action as the insert is being driven into position, FIG. 4 is a sectional view taken on line 4—4 of FIG. 1 illustrating the details of the chip relief apertures formed with the chip breaking obstruction, FIG. 5 is an enlarged detail view through a chip relief aperture showing an arcuately contoured form of chip breaking obstruction, FIG. 6 is an elevational view of a self-tapping threaded insert formed with another type of chip relief opening, FIG. 7 is an end view taken along line 7—7 of FIG. 6, FIG. 8 is an enlarged detail view through the chip relief opening of the self-tapping insert of FIG. 6 showing the chip breaking action against a planar obstruction.

Figure 9:
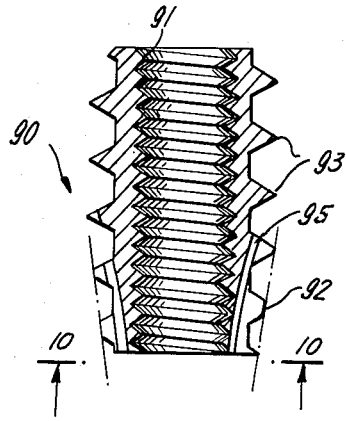
Figure 10:
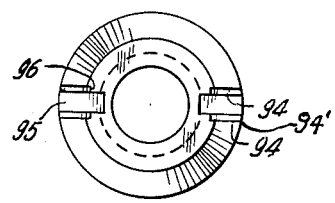
Figure 11:
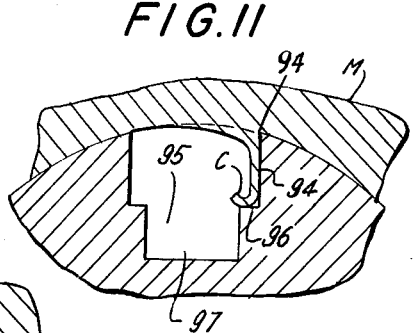

FIG. 9 is an enlarged cross sectional view through a self-tapping insert in which the chip passes along the exterior of the insert in accordance with the teachings of this invention, FIG. 10 is an end view taken on line 10—10 of the insert of FIG. 9, and FIG. 11 is an enlarged detail view through the thread relief opening of the FIG. 9 insert showing the chip breaking action.

Referring now to the drawings, the self-tapping insert 10, illustrated in FIGS. 1 to 4 comprises a cylindrical body having an axial passageway or bore 11 therein provided with an internally threaded surface adapted to be engaged by a conventional fastening member such as a machine screw or the like. The external surface of the insert 10 is formed with lower tapping threads 12 extending helically about the exterior surface of the insert and seating threads 17. These tapping threads 12 are formed with flat lands which serve the two-fold function of compressing the material into which the insert is being positioned and providing a cutting chisel surface. Cutting action is effected by the sharp trailing edge 13 (see FIG. 2) formed at the outer periphery of each of the tap chip relief openings 15, in conventional fashion.

In the conventional self-tapping insert of the type shown in FIGS. 1 to 4, the cutting edge 13 is formed by drilling the transversely extending openings 15 through the insert body into the bore 11 thereof. According to the invention, however, the inner portion of each tap chip relief opening 15 is formed of a diameter less than the diameter of the outer portion 14 thereof, thereby forming an obstruction shoulder 16 in the path of travel of any tap chip cut away by leading edge 13, as best shown in FIG. 3.

In the embodiment shown in FIGS. 1 to 4, the obstruction shoulder 16 is flat or planar and extends perpendicular to the side wall of portion 14 of the opening 15, whereas in the embodiment shown in FIG. 5 the obstruction shoulder 16' has a concave surface.

In the embodiment shown in FIG. 6, the insert body 60 is formed with an axial passageway 61 having an internally threaded surface. The outer surface of the insert body is formed with external tapping threads 62 and seating threads 63. A chip relief opening of rectangular configuration is formed in the insert by milling longitudinal slots 65 in the end of the insert which extend into the interior of the insert. Cutting action is effected by the sharp trailing edge 64' formed at the outer periphery of each of the tap chip relief openings 65 in conventional manner.

It will be noted that the inner portion of each tap chip relief slot 65 is of lesser transverse dimension than the outer portion 64 thereof so that an obstruction surface 66 (see FIG. 7) is produced against which the tap chip abuts as viewed in FIG. 8. This obstruction surface is flat or planar and is perpendicular to the side wall of portion 64.

In the embodiment of the invention shown in FIGS. 9 to 11, the insert body 90 is formed with an internally threaded bore 91 and an externally threaded surface having lower tapping threads 92 and upper seating threads 93. The cutting action is produced by milling longitudinally extending spaced slots 95 in the outer surface of the insert from the lower end thereof, the peripheral edge 94' of the slot 95 defining the cutting edge. As is clearly shown in FIG. 11, the outer portion 94 of the slot 95 is of greater width than the inner portion 97 thereof to define obstruction shoulders 96 to deflect the chips formed as a result of the tapping action, the tap chips moving into the slots 95.

The self-tapping inserts above described are employed in conventional fashion by driving the insert into an opening in the material which it is intended to provide with a tapped recess. As the tapping threads on the insert cut the tap for engagement with the external seating threads of the insert, it will be noted from FIGS. 3, 5, 8 and 11 that the tap chip C being cut from the material M is caused to abut against the obstruction shoulder 16 in FIG. 3; 16' in FIG. 5; 66 in FIG. 8 and 96 in FIG. 11 so as to cause the chip to bend back upon itself. This reverse bending of the chip causes it to break up into small pieces which move into the chip relief opening in conventional fashion.

By virtue of the fact that the chips have been broken up, removal from the insert is relatively simple by means of an air gun, or by inverting the object in which the insert is positioned, depending upon the size thereof.

By virtue of the fact that the chips have been broken up, removal from the insert is relatively simple by means of an air gun, or by inverting the object in which the insert is positioned, depending upon the size thereof.

It is thus seen that by the simple expedient of providing an obstruction adjacent the chip relief opening in the conventional insert, desired breakage of the chips into relatively small components may readily be attained thereby avoiding long strips which cannot readily be dislodged and which would prevent insertion of a screw into the insert.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A self-tapping insert for installation in an opening formed in a material relatively softer than the material of said insert, said insert comprising an elongated body member having a central threaded bore therethrough extending longitudinally thereof and having a threaded exterior surface with tapping threads formed at one end thereof, said tapping threads having a substantially flat crest portion with the height of the threads gradually diminishing toward said one end, said body member having a circular chip relief aperture extending inwardly from the tapping portion of the threaded exterior surface to communicate with said threaded bore, the severed ends of the threads at the outer periphery of said aperture defining cutting edges to cut a tap chip as the insert is being positioned in the opening of the material, and an obstruction in the path of movement of the chip through the aperture to cause such chips to break into relatively small pieces, said obstruction comprising a substantially right-angle, annular shoulder defined by a reduction in the width of said relief aperture and positioned radially inwardly of said cutting edges, whereby unsevered chips are prevented from entering and blocking said internal threads.

2. A self-tapping insert as in claim 1 in which said obstruction is planar and extends perpendicular to the direction of movement of the tap chip.

3. A self-tapping insert as in claim 1 in which said obstruction is arcuate and is engaged by the tap chip reversely to bend the latter.

4. A self-tapping insert for installation in an opening formed in a material relatively softer than the material of said insert, said insert comprising an elongated body member having a central threaded bore therethrough extending longitudinally thereof and having a threaded exterior surface with tapping threads formed at one end thereof, said tapping threads having a substantially flat crest portion with the height of the threads gradually diminishing toward said one end, said body member having a rectangular chip relief aperture extending inwardly from the tapping portion of the threaded exterior surface to communicate with said threaded bore, the severed ends of the threads at the outer periphery of said aperture defining cutting edges to cut a tap chip as the insert is being positioned in the opening of the material, and an obstruction in the path of movement of the chip through the aperture to cause such chips to break into relatively small pieces, said obstruction comprising a substantially right angle shoulder extending along at least one of the opposed axially extending edges of said relief aperture, wherein said one edge is the trailing edge of said aperture, said shoulder being defined by a reduction in the width of said aperture and being positioned radially inwardly of said cutting edges, whereby unsevered chips are prevented from entering and blocking said internal threads.

References Cited by the Examiner

UNITED STATES PATENTS

| | | | |
|---|---|---|---|
| 2,795,221 | 6/1957 | Braendel | 85—47 |
| 2,817,987 | 12/1957 | Bosse. | |
| 2,823,574 | 2/1958 | Rosan | 85—47 |
| 3,126,560 | 3/1964 | Jennings | 10—120 |

OTHER REFERENCES

Groov-Pin Corp., Tap-Lok Self-Tapping Inserts, pp. 1–7, Oct. 6, 1959.

EDWARD C. ALLEN, *Primary Examiner.*

R. S. BRITTS, *Assistant Examiner.*